H. WIESE.
PROCESS OF REFINING SUGAR.
APPLICATION FILED JAN. 22, 1910.
991,580.
Patented May 9, 1911.
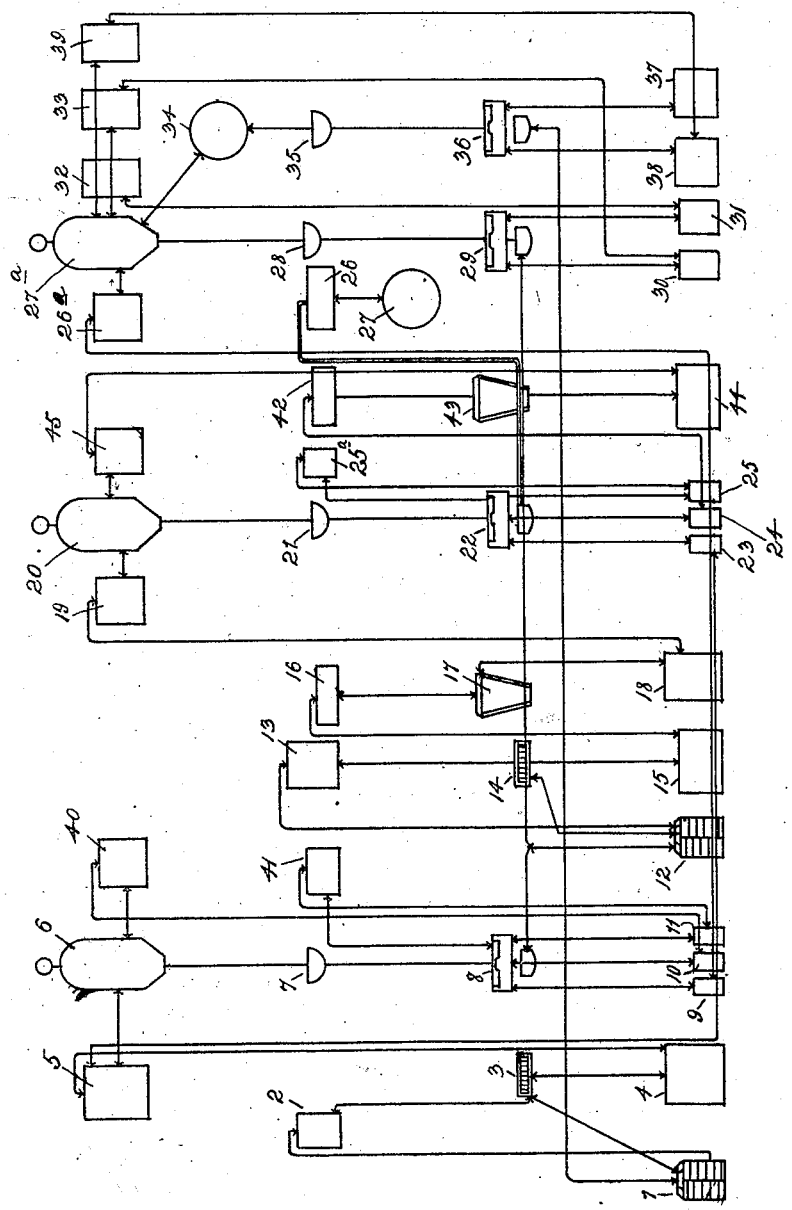
Witnesses
Inventor
Hermann Wiese

UNITED STATES PATENT OFFICE.

HERMANN WIESE, OF WALLACEBURG, ONTARIO, CANADA.

PROCESS OF REFINING SUGAR.

991,580.  Specification of Letters Patent.  Patented May 9, 1911.

Application filed January 22, 1910. Serial No. 539,544.

*To all whom it may concern:*

Be it known that I, HERMANN WIESE, a subject of the German Emperor, residing at Wallaceburg, in the county of Kent and Province of Ontario, Dominion of Canada, have invented certain new and useful Improvements in Processes of Refining Sugar, of which the following is a specification, reference being had therein to the accompanying drawings.

The invention relates to processes for refining raw cane sugar, and it is the primary object of the invention to avoid the use of bone black, which is an expensive factor in the usual refining process.

It is a further object to shorten the time of exposure of the syrup or sugar in solution, thereby preventing fermentation and the formation of invert sugar.

Still further it is an object to obtain a process in which the refining may be carried on continuously, and with only two resulting products—the one the refined sugar, and the other the low grade molasses—all intermediary products being distributed and combined with grades of equal purity in the main process.

With these objects in view, the invention consists in the process as hereinafter set forth.

In the drawings is illustrated diagrammatically an apparatus capable of carrying out the process.

The raw cane sugar is first melted at 1, the syrup being removed to a tank 2, and from there passed to a filter press 3. Here the mechanical and precipitated organic impurities are removed from the syrup, and the latter passes into the tank 4, while the sweet water, or wash, for the filter, is returned to the melter 1. From the tank 4 the liquid is pumped to an elevated tank 5, and is then passed into a vacuum pan 6. This is preferably so constructed that the boiling may be accomplished by the use of the exhaust steam, and with little expense. The boiled "fillmasse" is dropped into a mixer 7 and is cooled down to about 50° centigrade. It is then passed to a centrifugal 8 in which the syrup is first removed from the crystals, and the latter are then subjected to a double washing—first, by a syrup—and, lastly, by water or steam. The first syrup drawn off from the centrifugal is collected in a tank 9, the second syrup is collected in a tank 10, and the third syrup from the water or steam washing is collected in a tank 11. The result of this washing is that the sugar is free from glucose or invert sugar.

The sugar obtained from the process thus far described is next passed to a second melter 12, and is a second time treated in substantially the same manner as already described, passing from the melter to a tank 13, from this to a filter press 14, the purified syrup passing to a tank 15, and the second syrup being returned to the melter 12. From the tank 15 the syrup passes to the "blow-up" 16, in which it is treated with lime or bicarbonate of soda to neutralize the juice, and this treatment can be carried on without danger for the reason that there is no glucose or invert sugar present. As a result of this treatment, the juice is of an alkalinity such as to show a slight reaction by phenolphtalein. The solution at a temperature of 95° centigrade is then filtered through sand filter 17 passing to the tank 18, from which it is elevated to a tank 19, and introduced into a second vacuum pan 20. The "fillmasse" from this pan is discharged to the mixer 21, and thence to the centrifugal 22, where the syrup is extracted, and the crystals are washed, as in the previous treatment. The first syrup from the centrifugal 22 passes to the tank 23, from which it is returned to the tank 5, and combined with the juice from the tank 4. The second wash syrup from the centrifugal 22 passes to the tank 24, and the final wash syrup passes to the tank 25. The sugar crystals remaining are pure white and equal in grade to those obtained by the bone black process. The sugar crystals are then passed to a bin 26, and then to a drier 27, or it may be converted into any desired product, such as granulated or loaf sugar.

The syrup first extracted by the centrifugal 8 is thinned down to 33° Baumé, and is then conveyed from the tank 9 to tank 26ª, from which it passes to a third vacuum pan 27ª. The resulting fillmasse passes to the mixer 28 and centrifugal 29, from which the first syrup is collected in tank 30 and the second syrup in tank 31. The sugar obtained is equal in grade of purity to that resulting from the treatment in the centrifugal 8, and therefore is combined with that product, and is passed to the melter 12.

The second syrup collected in tank 31 is passed to a tank 33, where it is thinned down to 33° Baumé, is heated to 75° centigrade, and is taken as a cap in vacuum pan 27ª.

The syrup from the tank 30 is elevated into tank 33, and in a subsequent treatment is boiled in vacuum pan 27ª, and the fillmasse is passed to the crystallizer 34, where it is kept under agitation and cooled for about two days. It is then passed to the mixer 35 and to the centrifugal 36. The first syrup from this centrifugal is low grade molasses, which passes into the tank 37. The second wash syrup is "low green" passing to the tank 38, from which it is elevated into a tank 39 and is taken on top of the crystallized fillmasse in vacuum pan 27½, the sugar from the centrifugal 36, being practically the same in grade as the raw sugar, is returned to the melter 1.

The wash syrups, with exception of those the treatment of which has already been described, are utilized at various points in the process, as above described. Thus, the second syrup from the centrifugal 8, which is collected in the tank 10, is elevated therefrom to a tank 40, and is taken as a "cap" in vacuum pan 6. The third wash syrup from centrifugal 8 collected in tank 11 is elevated to a tank 41, from which it is returned to the centrifugal 8 for use as a second wash syrup. The wash syrup in tank 24 is passed to "blow-up" 42, where it is neutralized as in 16, and is passed to the sand filter 43 and then to a tank 44, from which it is elevated to a tank 45. From the latter it is taken as a cap into the vacuum pan 20. The third wash syrup collected in the tank 25 is pumped to the tank 25ª and used as a second wash syrup in the centrifugal 22. Thus all of the intermediary products are recombined with material for the main process, with the final products consisting of a refined white sugar and low grade molasses.

What I claim as my invention is:

1. The process of refining raw cane sugar without the use of bone black, which consists in melting, filtering, boiling to a fillmasse, extracting the syrup and washing the crystals whereby the latter are freed from invert sugar; in remelting, filtering, neutralizing, filtering, boiling to a fillmasse, extracting the syrup, and washing the crystals.

2. The process of refining raw cane sugar without the use of bone black, which consists in melting, filtering, boiling to a fillmasse, extracting the syrup and washing the crystals to free the same from the invert sugar; in remelting, filtering, neutralizing, filtering, boiling to a fillmasse, extracting the syrup and washing the crystals; in utilizing the more refined grades of the syrup extracted at the various points in the process for washes at a lower stage in the process and for caps in the boiling process, in diluting the low grade syrup and repeating the process to extract further sugar therefrom, and in distributing the sugar obtained from the syrup treatment to combine the same with grades of equal purity in the main process.

3. The process of refining raw cane sugar without the use of bone black, which consists in melting, filtering, boiling to a fillmasse, extracting the syrup, and washing the crystals to remove the invert sugar; in remelting, neutralizing, boiling to a fillmasse, extracting the syrup and washing the crystals; in diluting the low grade syrup, boiling to a fillmasse, separating the syrup and repeating the treatment to extract different grades of syrup; in distributing the sugars thus obtained to the grades of equal purity in the main process, and in utilizing the higher grades of the syrup for washes and for caps in the boiling process whereby the final products are restricted to refined white sugar and low grade molasses.

4. The process of refining raw cane sugar without the use of bone black, which consists in melting, filtering, boiling to a fillmasse, extracting the syrup, and washing the crystals; in remelting, filtering, neutralizing, boiling to a fillmasse, extracting the syrup, and washing the crystals; in diluting the low grade syrup and repeating the process to extract further sugar therefrom, in distributing the sugar of the further extraction with the grades of equal purity in the main process, and in utilizing the more refined syrups as washes and caps in the main process.

5. The process of refining raw cane sugar without the use of bone black, which consists in melting, filtering, boiling to a fillmasse, extracting the syrup, and washing the crystals; in remelting the crystals, neutralizing, boiling to a fillmasse, extracting the syrup, and washing the crystals; in diluting the low grade syrup of the first extraction, boiling to a fillmasse, extracting the syrup, rediluting the same and reboiling to a fillmasse and extracting the syrup to obtain further sugar of different grades and low grade molasses, in distributing the sugars of the further extraction to the grades of equal purity in the main process and in utilizing the intermediary extracted syrups as washes and caps in different stages of the main process whereby the crude product is converted into refined sugar and low grade molasses.

In testimony whereof I affix my signature in presence of two witnesses.

HERMANN WIESE.

Witnesses:
NELLIE KINSELLA,
W. J. BELKNAP.